(No Model.) 2 Sheets—Sheet 1.
E. B. RICH.
SAW STRETCHING MACHINE.
No. 548,394. Patented Oct. 22, 1895.
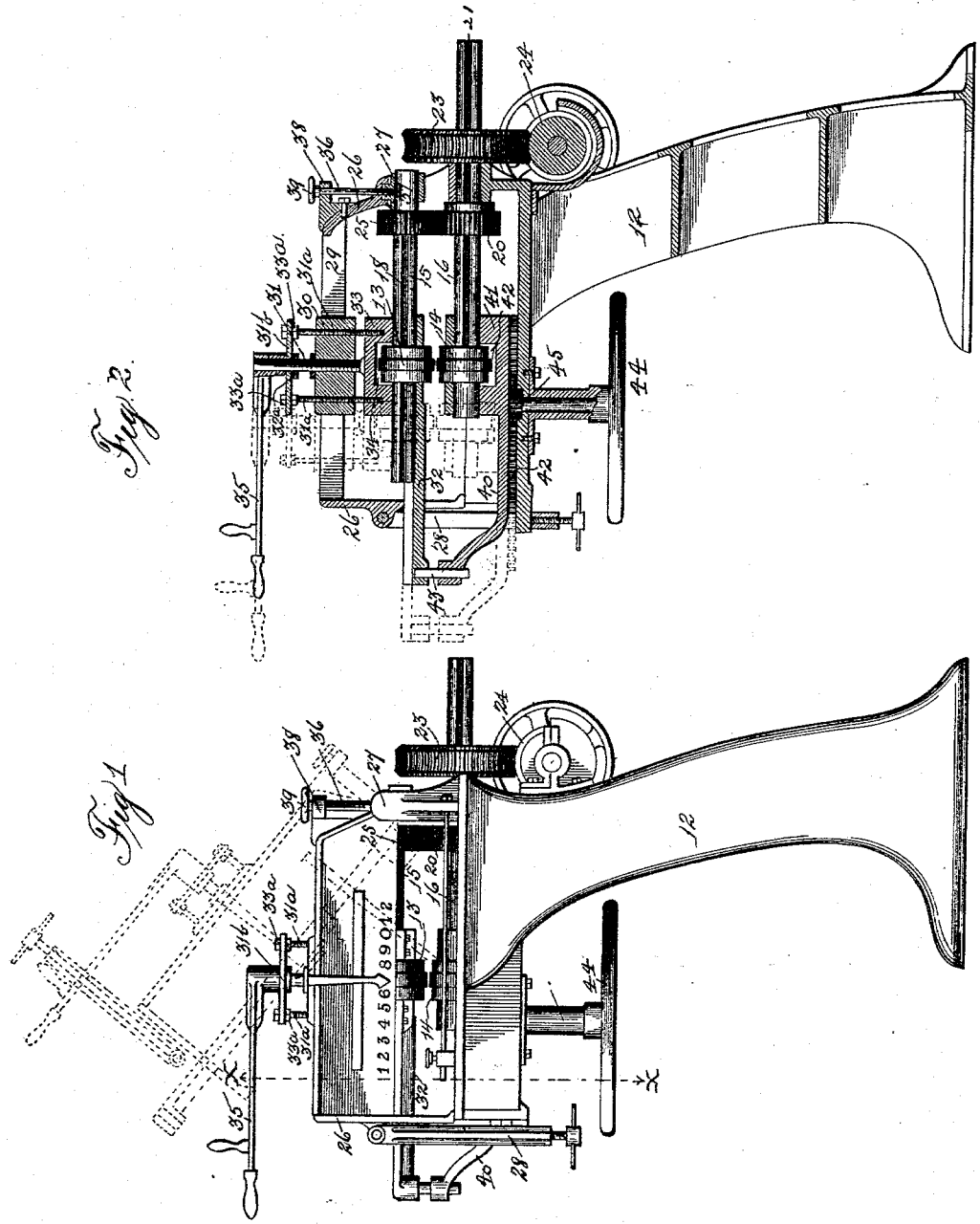
Witnesses:
C. W. Graham
W. T. Tompkins
Inventor.
Elisha B. Rich,
By Chas. E. Buckley.
Attorney

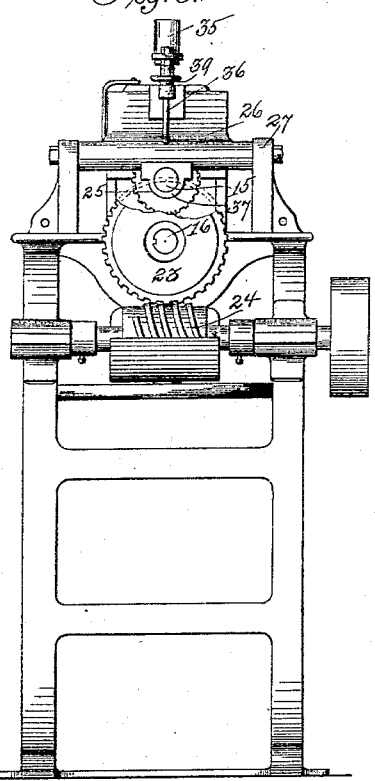

UNITED STATES PATENT OFFICE.

ELISHA B. RICH, OF CHICAGO, ILLINOIS.

SAW-STRETCHING MACHINE.

SPECIFICATION forming part of Letters Patent No. 548,394, dated October 22, 1895.

Application filed April 29, 1893. Serial No. 472,450. (No model.)

*To all whom it may concern:*

Be it known that I, ELISHA B. RICH, a citizen of the United States, residing at Chicago, in the county of Cook and State of Illinois, have invented certain new and useful Improvements in Saw-Stretching Machines, of which the following is a specification.

My invention relates to that class of machines which are employed to roll, stretch, and re-form saws which by stress and strain during use have become distorted.

Heretofore it has been the custom in machines of this type to provide rolls mounted upon vertically-positioned shafts, between which the saw is placed, and upon which they are adapted to act for the purpose aforesaid, these rolls, however, being elevated by means of positively-acting devices and then permitted to fall by gravity in order to move the rolls up and down, so that the same may act upon all parts of the surface of the saw instead of moving the saw about relatively to stationary rolls.

My object is to overcome the necessity of handling and moving about the heavy and cumbersome saw, in order that the rolls may act upon different parts thereof, and to provide a horizontally-positioned machine adapted to positively and directly move the rolls back and forth in both directions, the saw itself remaining in a stationary position.

My invention consists, in conjunction with a plurality of stretching-rolls revolved by suitable mechanism and adapted to act upon the flat surface of a saw, of mechanism by which the shafts of said rolls are geared together and rotated in unison and said rolls or roll and shaft moved back and forth relative to the saw-surface, in addition to their movement of rotation, by means of a positive connection between said rolls and the member manually operated to effect this movement.

My invention consists, also, in certain details of construction and arrangement of parts to be particularly described, and pointed out in my claims, reference being had to the accompanying drawings, in which—

Figure 1 is a side elevation of the complete machine, the dotted lines designating the position of the hinged roll-carrying frame when the same is raised to admit a saw to be stretched. Fig. 2 is a vertical central sectional elevation showing the construction, the dotted lines designating one extreme position to which the sliding frame and stretching-rolls may be extended. Fig. 3 is a rear end elevation of the machine. Fig. 4 is a cross-section on the line $x$ $x$ of Fig. 1. Fig. 5 is a detail enlarged view of the device for maintaining the vertically-movable or upper-roll shaft in a true horizontal plane. Fig. 6 is an enlarged detail cross-sectional view showing the manner in which the upper roll is mounted upon the upper-roll shaft and laterally movable thereon. Fig. 7 is a like view showing the manner in which the gear-wheel driving the lower-roll shaft is mounted on the latter, so as to permit a lateral movement therethrough of said roll-shaft.

The supporting-pedestal of the machine is designated at 12 and the upper and lower stretching-rolls, respectively, at 13 and 14. These two rolls are mounted upon two shafts, the upper roll 13 being mounted upon the upper shaft 15 and the lower roll 14 upon the lower shaft 16. The upper-roll shaft 15 is stationary, so far as an endwise or longitudinal movement is concerned, the upper roll 13 being mounted thereon, so as to be permitted a lateral movement along said shaft by means of a feather 17 on the roll 13, Fig. 6, and a feather-way 18 in the shaft 15. The lower roll 14 is mounted rigidly upon its shaft 16, so far as a lateral movement is concerned, said shaft being permitted an endwise or longitudinal movement by means of the feather 19 on the transmitting gear-wheel 20 and the feather-way 21 in the said shaft 16, and also by a feather on the driving gear-wheel 23 within the said feather-way 21, as shown in Fig. 7.

A movement of rotation is imparted to the driving gear-wheel 23 by means of the screw 24 on the pulley-shaft, Fig. 3, which movement of rotation is imparted to the lower-roll shaft 16 and transmitted by gear-wheel 20 to the gear-wheel 25 on the upper-roll shaft 15.

The upper roll 13 is moved laterally along the relatively-stationary upper shaft 15 and the lower shaft 16 moved longitudinally and its roll 14 carried along laterally in unison with the roll 13 by means of two frames adapted to be joined and held together, the construction of which I will proceed to describe, referring first, however, to the hinged frame 26, pivoted at the rear end of the machine at 27 and carrying at its outer end the hinged strap-piece 28, by which said hinged frame is held in position during the active operation of stretching the saw. This frame also has the guideways or travelers 29, Fig. 4, for the sliding block 33, the latter having a central screw-threaded perforation, in which is the screw-threaded pin 31.

The upper longitudinally-sliding frame 32 carries the sliding block 33 held between the traveler-ways 29, Fig. 3, a recess 34 in which block surrounds the upper portion of the upper roll 13.

The pin 31, which is rotated by the hand-lever 35, is so secured at its lower end to the sliding block 33 as to bear upon said block and thus in the movement of the hand-lever to move the said block downward, together with the frame 32, shaft 15, and the upper roll 13, which roll is thereby compressed upon a saw interposed between it and the lower roll 14. I provide, also, the pins 31ᵃ, extended through the sliding block 30 and connected together at their upper ends by means of the plate-piece 31ᵇ and secured at their lower ends to the sliding block 33. In order to raise the sliding block, the upper roll, and roll-shaft, the hand-lever 35 rotates the pin 31, causing the washer 32ᵃ to bear against the plate-piece 31ᵇ and thereby raise the sliding block 33, the upper roll, and shaft by means of the pins 31ᵃ. By means of these pins 31ᵃ, connected by the notch 33ᵃ with the plate-piece 31ᵇ, I am enabled to adjust the shaft 15 in a suitable plane to cause the upper roll 13 to meet squarely the lower roll 14.

In order to maintain the shaft 15 in a true horizontal plane at all points, I provide the adjusting-pin 36, which pin is screw-threaded at its lower end and engages in the boxing 37, Fig. 5, the latter having a slight vertical play, the upper end of said pin being held by an abutment 38 from the hinged frame 26 and carrying the hand-wheel 39. The lower sliding frame 40 also carries a sliding block 41, similarly recessed at 42, in which recess is the lower portion of the lower roll 14.

The two outer ends of the upper sliding frame 32 and the lower sliding frame 40 are held together, so as to move longitudinally in unison by means of the pin 43. Secured to the under side of the lower sliding frame 40 is a rack 44, Fig. 2, a hand-wheel 45 being provided, which latter operates the gear-pinion 46, meshing with said rack.

The operation of my device is as follows: The saw being in place between the rolls, which have been adjusted relatively to each other, as necessary, to stretch the saw, and it being desired to act with the rolls upon various different parts of the flat surface of the saw, the operator simply moves the hand-wheel 45, which in turn imparts a longitudinal movement to the joined sliding frames 32 and 40, carrying the sliding blocks 33 and 41, and thus moving laterally the rolls 13 and 14 relative to the saw between them, the shaft 15 remaining stationary and the roll 13 moving along the same, while the shaft 16 moves endwise, carrying the roll fixed thereon.

Having thus described my invention, what I claim as new therein, and desire to secure by Letters Patent, is—

1. The combination in a saw stretching machine, of a plurality of stretching rolls mounted upon rotated shafts and adapted to be moved laterally relatively to a saw to be operated upon and frames within which said shafts and rolls are mounted, one of which frames is hinged to the other and adapted to be moved away from the other, together with positively and directly operating devices by which said rolls are moved positively back and forth to adjust the rolls relatively to the saw surface.

2. The combination in a saw stretching machine, of a plurality of stretching rolls mounted upon rotated shafts and adapted to be moved laterally from side to side relative to a saw to be operated upon and longitudinally movable frames acting upon, or carrying, the rolls to impart to the same the movement aforesaid and a manually operated rack and pinion device between the movable frame and the point of application of the power.

3. The combination in a saw stretching machine, of a plurality of stretching rolls mounted upon rotated shafts and adapted to be moved laterally from side to side relative to a saw to be operated upon and longitudinally sliding frames acting upon, or carrying, the rolls to impart to the same the movement aforesaid, a connecting member detachably holding the sliding frames so that the same move in unison and manually operated devices connected with said sliding frames whereby the same are actuated.

4. The combination in a saw stretching machine, of a plurality of stretching rolls mounted upon rotated shafts and adapted to be moved laterally relative to a saw to be operated upon, sliding frames within which said shafts and rolls are mounted, one of which frames is hinged to the other and adapted to be raised away from the other, a connecting member detachably holding the sliding frames so that the same move in unison and manually operated devices connected with said sliding frames whereby the same are actuated.

In testimony whereof I have hereunto set my hand this 11th day of January, 1893.

ELISHA B. RICH.

In presence of—
J. C. GORES,
J. E. SAMUELSON.